3,036,053
COPOLYMERIZATION OF STYRENE AND
ALPHA-METHYLSTYRENE
Kenneth W. Doak, Pittsburgh, Pa., assignor to Koppers Company, Inc., a corporation of Delaware
Filed Feb. 25, 1958, Ser. No. 717,472
5 Claims. (Cl. 260—88.2)

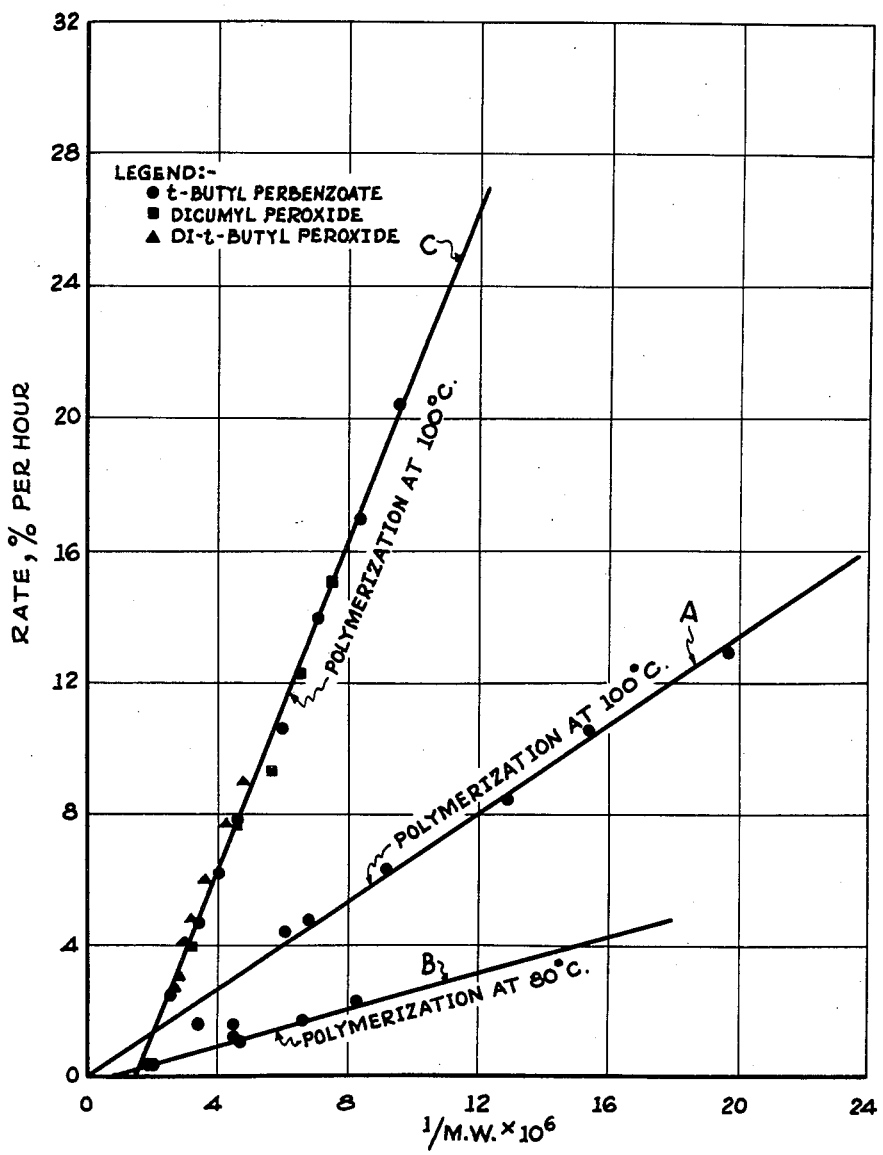

This invention relates to an improved polymerization process for copolymerizing vinyl aryl compounds. In one specific aspect, it relates to a suspension polymerization process for copolymerizing styrene and alpha-methylstyrene.

Styrene-alpha-methylstyrene copolymers are of considerable commercial interest because of their enhanced dimensional stability to heat (measured by heat distortion temperature of Vicat softening point) compared with that of polystyrene. Commercial polystyrene has a heat distortion temperature of about 93° C. and a Vicat softening point of about 101° C. The increased cost of producing a styrene-alpha-methylstyrene copolymer is more than offset by obtaining a polymeric material having a Vicat softening point of 105–115° C. Such a material is useful for many purposes wherein polystyrene is unsuitable, e.g. in the manufacture of radio cabinets (for which the Fire Underwriters Laboratories' specifications call for a material having a higher softening point than polystyrene) and similar articles.

It is well-known that alpha-methylstyrene will not readily polymerize under the conditions normally used for the free radical polymerization of styrene. Even with the use of large amounts, e.g. 2–10%, of a peroxide initiator such as benzoyl peroxide, a low yield of a very low molecular weight product is obtained.

It is likewise known that mixtures of styrene and alpha-methylstyrene do not polymerize in the same manner as styrene alone, since the presence of alpha-methylstyrene has an inhibiting effect on the copolymerization. Thus, in a free radical polymerization, a mixture of styrene and alpha-methylstyrene polymerizes more slowly than styrene alone under identical conditions. The rate of copolymerization decreases with increasing amounts of alpha-methylstyrene.

In the well-known process of Gaetano F. D'Alelio described in U.S. Patent No. 2,656,334, styrene is polymerized in the presence of a suitable combination of peroxide catalysts under appropriate conditions until as little as 0.01% of the monomer remains. If a mixture of styrene and alpha-methylstyrene is polymerized under these same conditions, the alpha-methylstyrene enters the copolymer much more slowly than the styrene; thus the portion of alpha-methylstyrene in the residual monomer mixture increases as a higher percentage conversion of monomer to polymer is effected. Generally above about 90% conversion, the residual monomer contains a high proportion of alpha-methylstyrene which, as I have previously indicated, will not polymerize to a high molecular weight product. It is well-established that vinyl aryl polymers having substantial amounts of residual monomer and low molecular weight polymers present therein have certain undesirable properties, viz: high shrinkage in boiling water, low resistance to heat distortion, potential discoloration due to oxidation of the monomer and crazing due to escape of volatile materials.

Accordingly, to obtain a commercially useful product it is necessary to remove the residual monomer and other by-products formed during the polymerization reaction. If the copolymerization of styrene and alpha-methylstyrene is effected by conventional styrene polymerization techniques, such as that of D'Alelio, removal of the undesirable residual materials is economically dubious. Moreover, the time required for polymerization, using such a process, is commercially prohibitive.

Various procedures have been proposed for overcoming the aforesaid difficulties. One method, that of British Patent 718,687 involves a carefully controlled bulk polymerization with or without a catalyst followed by a vaporization at pressures under 50 mm. of mercury and temperatures of 240–280° C. Unfortunately, this process is somewhat limited, since, in order to obtain a high conversion of monomer to polymer (above 90%) and to produce a polymer having a commercially desirable Vicat softening point (105–115° C.), it is necessary to polymerize for about 10–20 days. Furthermore, in order to make copolymers having a high styrene content, e.g. 75%, in good yield and of high softening point at least 10 days' polymerization time is required. Copolymers having a styrene content of 75–90% having the aforesaid characteristics, are especially desirable because of reduced raw material cost. It is quite obvious that with a ten-day polymerization time, the production cost of the copolymer is very high.

British Patent 752,572 describes an improved process for making styrene-alpha-methylstyrene copolymers containing 10–30% alpha-methylstyrene wherein a mixture of two peroxides with different temperature optima, e.g. benzoyl peroxide and di-t-butyl peroxide, are used to initiate the polymerization. The monomer mixture is heated in bulk at 60–70° C. for 24–48 hours and the temperature is thereafter increased incrementally to a maximum of 190° C. The total polymerization time required is greater than 100 hours. The polymer is then cooled, crushed, and heated in a vacuum at 120–130° C. for up to 30 hours to remove volatile materials. While this process is capable of producing material having a Vicat softening point as high as 105° C. with good conversions, the total time required to obtain the ultimate product still makes the process commercially unattractive.

I have found a method of making styrene and alpha-methylstyrene copolymers containing 5–30% of alpha-methylstyrene wherein the polymerization time is markedly reduced, and copolymers having molecular weights up to 150,000 and intrinsic viscosity of 0.5 to 1.0 (which delineates the molecular weight range) and Vicat softening temperatures of 105–115° C. are obtained. Using my novel process detrimental side reactions are minimized, so that volatile materials, consisting essentially of residual monomers, are readily removed.

It is, therefore, an object of the present invention to provide a novel method for copolymerizing styrene and alpha-methylstyrene, whereby a commercially desirable copolymer is produced and at the same time the polymerization time required is reduced by about 60–80%.

In accordance with the present invention I am able to produce a commercial copolymer in a considerably shorter time than has been heretofore possible by increasing the rate of polymerization and concomitantly controlling the concentration of free radicals at all times during polymerization. The concentration of free radicals is controlled by choosing a particular temperature range, with or without the use of a peroxide initiator, that will permit a slight increase in the concentration of free radicals of the system as the temperature increases and polymerization progresses.

It is helpful in understanding my invention to keep in mind the following theoretical considerations.

If the concentration of free radicals in the system is controlled by temperature alone, the rate at which the free radicals are formed is determined by Equation 1.

(1) $$R_{th}=2k_{th}(M)^2$$

wherein:

$R_{th}$ is the rate of thermal initiation, $k_{th}$ is the rate constant for the thermal initiation of the polymer chain, and (M) is the total concentration of monomer (styrene and alpha-methyl-styrene).

If a peroxide initator is used, the polymerization can be effected at lower temperatures and the free radicals provided by the initiator predominate in the system. Since the major portion of the free radicals are furnished by the initiator, the rate at which free radicals are formed in the system, or the rate of initiation, is determined largely by Equation 2.

(2) $$R_i = k_i(I)$$

wherein:

$R_i$ is the rate of initiation, $k_i$ is the rate constant for initiation of a polymer chain, and (I) is the concentration of initiator.

The rate at which the polymerization progresses is shown in Equation 3.

(3) $$R_p = k_p(R\cdot)(M)$$

wherein:

$R_p$ is the rate of polymerization, $k_p$ is the rate constant for polymerization or propagation of a polymer chain, (R·) is the free radical concentration, and (M) is the total concentration of monomer.

The rate at which growing polymer radicals react to terminate the growth of chains is shown below in Equation 4.

(4) $$R_t = 2k_t(R\cdot)^2$$

wherein:

$R_t$ is the rate of termination, $k_t$ is the rate constant for the termination of polymer chains, and (R·) is the free radical concentration.

It is apparent from the above equations that the rate of polymerization is influenced by the rates of initiation, propagation and termination of the individual polymer chains. At low degrees of conversion of monomer to polymer, wherein conditions approach the steady state, the rates of initiation and termination are substantially equal. Assuming this, Equation 2 can be substituted into Equation 4 as follows:

(5) $$k_i = 2k_t(R\cdot)^2$$

or $$(R\cdot) = \sqrt{\frac{k_i}{2k_t}} \sqrt{(I)}$$

Substituting Equation 5 into Equation 3 gives:

(6) $$R_p = k_p \sqrt{\frac{k_i}{2k_t}} (M) \sqrt{(I)}$$

Thus, the rate of polymerization at low conversions is proportional to the square root of the initiator concentration.

The degree of polymerization (or molecular weight) is equal to the rate of propagation divided by the rate of termination. Dividing Equation 3 by Equation 4 gives:

(7) $$\bar{P} = \frac{k_p(M)}{2k_t(R\cdot)}$$

wherein $\bar{P}$ is the degree of polymerization. Thus, the degree of polymerization (or molecular weight) is inversely proportional to the free radical concentration. Substituting Equation 5 into Equation 7 gives:

(8) $$\bar{P} = \frac{k_p(M)}{\sqrt{2k_t k_i}} \sqrt{(I)}$$

The degree of polymerization at any temperature is, therefore, inversely proportional to the square root of the initiator concentration. It is also apparent from Equation 8 that the degree of polymerization is dependent upon the relative values of the three rate constants. Each rate constant varies logarithmically with the temperature. The temperature coefficient for the rate of initiation is greater than that for the rate of propagation. The temperature coefficient for the rate of termination is less than that for the rate of propagation.

It is obvious that as the temperature of the system is increased more free radicals will be formed, either by thermal initiation or by the decomposition of a catalyst initiator present in the system. Thus, at any conversion or temperature, if the concentration of initiator is held constant, the rate of polymerization increases and the molecular weight decreases. If the concentration of free radicals is held constant and the temperature is increased, the rate of polymerization increases less rapidly as the temperature increases, but the molecular weight increases. I have found that by controlling the rate of formation of free radicals, either by choosing an appropriate temperature range or by choosing an appropriate temperature range coupled with an initiator with the proper rate of decomposition, to permit a slight increase in the free radical concentration as the temperature increases, the rate of polymerization can be increased and a high molecular weight product can be obtained. By a "slight" increase I mean that increase in the free radical concentration that will result in a product having an intrinsic viscosity of 0.5–1.0 as determined by solubility in toluene at 30° C. My invention can be more clearly understood with reference to the accompanying drawing wherein:

The FIGURE shows the rate of polymerization for an 85:15 mixture of styrene-alpha-methylstyrene monomers at 80° C. (curve B) and 100° C. (curve A), and styrene at 100° C. (curve C) using various initiator systems (i.e. lauroyl peroxide, benzoyl peroxide, and t-butyl perbenzoate) plotted as a function of the reciprocal of the molecular weight.

From the figure it is observed that the copolymerization of styrene and alpha-methylstyrene in the presence of t-butyl perbenzoate is a linear function of the reciprocal of the molecular weight. This observation is likewise true for the polymerization of styrene at 100° C. using three different peroxides; thus showing that the only difference in behavior between the various peroxides is their rate of free radical formation, i.e. their rate of decomposition. The slopes of the curves of the figure are proportional to the term $k_p^2/k_t$ in which $k_p$ and $k_t$ are the rate constants for chain propagation and chain termination respectively. In the case of the copolymer it is readily seen that if the rate of free radical formation is properly controlled, the rate of polymerization at 100° C. can be increased by a factor of approximately 2.6 over that at 80° C. (the difference in slope between the two curves) without reducing the molecular weight of the polymer. The change in slope from 80° C. to 100° C. is a result of the increase in the term $k_p^2/k_t$, which shows that the rate of chain propagation is influenced more by temperatures than is the rate of chain termination. By comparing the slopes of the curves for styrene-alpha-methylstyrene at 100° C. and styrene at 100° C., it is readily seen that at a given temperature the rate of copolymerization of the 85–15 monomer mixture can be only 30% as great as the rate of homopolymerization of styrene if an equivalent molecular weight is to be obtained. Thus, a high polymerization temperature (125–140° C.) or a polymerization temperature of 100–125° C. with the proper choice of initiator is imperative in order to obtain a high molecular weight product in a reasonable polymerization time.

The data on which the figure is based are shown hereunder in Table I.

TABLE I

*Polymerization of 85:15 Mixture of Styrene and Alpha-Methylstyrene in the Presence of t-Butyl Perbenzoate, (I)*

| Part I | (I) | Hours | Percent Conv. | Rate Percent/Hr. | Mol. Wt. $\times 10^{-3}$ | $10^8$ Mol. Wt. |
|---|---|---|---|---|---|---|
| Polymerization at 80° C. | | | | | | |
| ------ | ------ | 8.00 | 2.36 | 0.30 | 555 | 182 |
| 0.146 | 0.382 | 7.00 | 5.63 | 0.81 | 292 | 343 |
| 0.292 | 0.540 | 6.00 | 6.49 | 1.09 | 225 | 445 |
| 0.292 | 0.540 | 10.00 | 10.51 | 1.05 | 215 | 465 |
| 0.723 | 0.850 | 5.00 | 8.13 | 1.63 | 152 | 658 |
| 1.245 | 1.116 | 4.00 | 8.22 | 2.06 | 122 | 820 |
| ------ | ------ | 12.00 | 3.68 | 0.31 | 490 | 204 |
| Polymerization at 100° C. | | | | | | |
| ------ | ------ | 1.75 | 2.66 | 1.52 | 280 | 455 |
| 0.118 | 0.343 | 1.50 | 7.01 | 4.67 | 140 | 680 |
| 0.236 | 0.486 | 1.50 | 9.48 | 6.32 | 110 | 909 |
| 0.472 | 0.687 | 1.50 | 12.80 | 8.53 | 79 | 1,266 |
| 0.717 | 0.847 | 1.50 | 15.82 | 10.55 | 65 | 1,538 |
| 1.100 | 1.049 | 1.25 | 16.27 | 13.02 | 51 | 1,961 |
| 0.094 | 0.307 | 1.75 | 7.99 | 4.57 | 170 | 602 |
| ------ | ------ | 5.00 | 6.89 | 1.38 | 280 | 357 |

*Polymerization of Styrene at 100° C. in the Presence of Various Peroxide Initiators (I)*

| Pts. Peroxide | (I) | Hours | Percent Conv. | Rate percent/Hr. | Mol. Wt. $\times 10^{-3}$ | $10^8$ Mol. Wt. |
|---|---|---|---|---|---|---|
| t-Butyl Perbenzoate | | | | | | |
| -------- | ---- | 1.75 | 4.34 | 2.48 | 400 | 250 |
| 0.040 | 0.200 | 1.75 | 8.18 | 4.67 | 305 | 328 |
| 0.082 | 0.286 | 1.75 | 11.33 | 6.47 | 250 | 400 |
| 0.119 | 0.345 | 1.50 | 11.56 | 7.71 | 225 | 445 |
| 0.241 | 0.491 | 1.50 | 15.87 | 10.58 | 167 | 599 |
| 0.398 | 0.631 | 1.50 | 20.98 | 13.99 | 142 | 704 |
| 0.563 | 0.750 | 1.25 | 21.29 | 17.03 | 120 | 831 |
| 0.802 | 0.896 | 1.25 | 25.65 | 20.52 | 105 | 953 |
| Dicumyl Peroxide | | | | | | |
| 0.113 | 0.336 | 3.00 | 6.65 | 2.22 | 430 | 233 |
| 0.218 | 0.467 | 3.00 | 12.09 | 4.03 | 330 | 303 |
| 0.433 | 0.658 | 3.00 | 15.51 | 5.17 | 285 | 351 |
| 0.733 | 0.856 | 3.00 | 22.49 | 7.50 | 225 | 445 |
| 1.197 | 1.094 | 3.00 | 28.61 | 9.54 | 180 | 555 |
| 1.741 | 1.320 | 2.00 | 24.55 | 12.28 | 155 | 645 |
|  |  | 2.00 | 30.03 | 15.02 | 133 | 752 |
| t-Butyl Peroxide | | | | | | |
| 0.038 | 0.195 | 3.17 | 8.85 | 2.79 | 385 | 260 |
| 0.088 | 0.297 | 5.17 | 16.12 | 3.12 | 360 | 278 |
| 0.212 | 0.460 | 3.17 | 13.09 | 4.13 | 345 | 290 |
| 0.210 | 0.458 | 5.17 | 21.39 | 4.14 | 345 | 290 |
| 0.320 | 0.566 | 3.17 | 15.97 | 5.04 | 310 | 323 |
| 0.547 | 0.740 | 3.17 | 19.78 | 6.24 | 270 | 370 |
| 0.835 | 0.914 | 2.00 | 15.11 | 7.56 | 240 | 416 |
| 1.204 | 1.097 | 2.00 | 18.29 | 9.15 | 210 | 475 |

Curves similar to those in the figure are used to determine the rate of polymerization permissible at a given temperature to obtain a product of a predetermined molecular weight (or intrinsic viscosity).

The method of my invention comprises forming an aqueous suspension of styrene and alpha-methylstyrene monomers, wherein the mixture of monomers consists of 95–70 parts styrene and 5–30 parts alpha-methylstyrene. The suspension is stabilized by adding a suspending agent such as tri-calcium phosphate. The methods of preparing the suspensions, various suitable suspending agents, and amounts used are described in U.S. Patents 2,687,408 and 2,715,118 issued to J. M. Grim. In addition to the stabilizing agent, the use of a small quantity of surface active agent to reduce surface tension is often helpful. Any nonionic, anionic, and cationic surfactant material is acceptable for this purpose. Alkyl aryl sulfonates and octylphenoxy polyether alcohols are quite suitable. Generally speaking, the mixed monomers comprise about 40–50% by weight of the total suspension. The percentages of suspending agent and surfactant added to the system are based on the total weight of monomer. From 0.2–0.5% suspending agent and 0.001–0.05% surfactant are adequate.

The concentration of free radicals present at any time during polymerization may be controlled to provide a slight increase in the concentration thereof in the system by operating the temperatures from 125–140° C. Somewhat lower temperatures, viz: 100–125° C., may be used in combination with a proper choice and amount of organic peroxide initiator.

The choice of a peroxide initiator for purposes of my invention is predicated on its decomposition temperature. An effective initiator will decompose slowly at the temperatures employed for the polymerization process. Thus, to be effective the organic initiators of the present invention must decompose in the range of about 100–125° C. Such peroxides include, but are not limited to tertiary-butyl perbenzoate, dicumyl peroxide, di-t-butyl peroxide, 2,2-bis-t-butyl peroxy-butene, di-tertiary-butyl di-peroxy phthalate, and the like. Other suitable catalysts include those falling within the desired decomposition range which are listed in U.S. Patent 2,676,944 of K. W. Doak and Belgian Patent 547,998. Catalysts of the type R—O—O—R are preferred to the type R—O—O—H.

The catalyst should be present in amounts ranging from 0.00–0.50% based upon the initial weight of the monomer mixture in the suspension. As I have indicated, the catalyst may be omitted altogether using the higher polymerization temperatures of my invention, since a sufficient concentration of free radicals is produced by thermal initiation. If too great an excess of catalyst is employed, the concentration of free radicals becomes too high and large amounts of low molecular weight polymer are formed. If the polymer chains are not permitted to grow to a sufficient average length, it is not possible to obtain a final product having the desired high Vicat softening point. The free radical concentration used also varies with the intended composition of the polymer, since styrene and alpha-methylstyrene polymerize at a different rate. The preferred amount of catalyst for purposes of my invention ranges from 0.10–0.20% by weight of monomer.

The actual polymerization is conducted in an inert atmosphere. Nitrogen gas is quite suitable for this purpose. The temperature of polymerization varies with the desired composition of polymer, the choice of catalyst, if any, and the amount of catalyst employed. Generally speaking, lower temperatures are used for making the copolymers with higher alpha-methylstyrene content.

I have previously indicated that temperatures of about 125–140° C. are satisfactory when no catalyst is used. When a catalyst is used in the amount indicated hereinabove, temperatures of 100–125° C. are quite suitable. Often, it is effective to conduct the polymerization at a lower temperature, e.g. 100–115° C., for a major portion of the polymerization time and thereafter to complete polymerization at temperatures of about 135–140° C. Polymerization is continued until at least about 90% conversion is reached to avoid a costly and time-consuming separation and recovery of residual monomers from the polymerized mass. During polymerization the pressure in the reactor increases from about atmospheric to about 35–40 p.s.i.g.

The time required to complete the polymerization ranges from about 11–26 hours when a catalyst initiator is used, depending, of course, upon the alpha-methylstyrene content of the copolymer. For example, if a 70–30 styrene to alpha-methylstyrene copolymer is desired, the polymerization time will run as high as 36 hours. If no catalyst is used, polymerization can generally be completed in 30–50 hours. The catalytic technique is the preferred embodiment of my invention, since the saving in polymerization time generally more than offsets the cost of the catalyst initiator.

To obtain the superior high molecular weight, high Vicat softening point copolymers of the present invention, it is necessary to remove the residual monomer mixture and other low molecular weight materials formed during the course of reaction. Often, before removal of these residual materials, Vicat softening temperatures of copolymers made by my novel method are greater than 100° C. After the residual material is removed, the Vicat softening point ranges from about 105–115° C.

The residual material may be removed in any manner conventional to the art, e.g. evaporation under vacuum, precipitation from a solvent, or steam stripping. Steam stripping at temperatures above 100° C. affords a particularly rapid way of removing the undesirable residual material. Steam stripping is accomplished by passing superheated steam at a predetermined temperature through the suspension of polymer particles. The residual materials are vaporized and carried off with the steam. Slightly higher temperatures are more effective since, at these temperatures, the residual materials can be more rapidly removed. A temperature range of 100–150° C. is quite suitable. The time required for steam stripping is about 5–10 hours, if at least 90% conversion is obtained during the polymerization process.

The effectiveness of the steam stripping technique as applied to my novel polymerization process is astonishing in view of findings reported by Daumiller in U.S. Patent 2,713,043. Daumiller noted that steam stripping at 100° C. does not significantly improve polystyrene or interpolymerizates thereof having a softening point similar to that of polystyrene and prepared from styrene and other organic compounds polymerizable under the same conditions as polystyrene.

I have previously indicated the importance of obtaining at least about 90% conversion before stopping the polymerization reaction. The presence of excessive amounts of residual monomer mixture effectively reduces yield of product obtained per run. Furthermore, time required for steam stripping is greatly increased and the cost of recovering the monomer from the steam after it has been removed from the polymer becomes exceedingly high. For example, if the conversion is only about 76%, 32 hours steam stripping time is required.

As I have previously indicated, the residual material may also be removed by evaporation in vacuum. Using this process the polymer is cooled and heated in vacuum at temperatures of about 120–130° C.

Precipitation from a solvent such as toluene or benzene is also an effective method of removing residual material. By this method the polymerized mass is dissolved in a solvent, e.g. benzene, and then added to an agitated bath of a non-solvent, e.g. methanol. The polymer precipitates out and the residual material remains in solution.

After removal of the residual material the polymer thus obtained is treated with 37% HCl, centrifuged, and then washed with water. The polymer is thereafter dried at a temperature of about 70° C. for about 2 hours.

The copolymers obtained by my novel method are characterized by a Vicat softening point of about 105–115° C., a heat distortion temperature of 205–225° F., an intrinsic viscosity of about 0.5–1.0, a residual monomer content of about less than about 0.1%, a notched impact strength comparable to polystyrene, and a tensile strength of about 6000–9000.

The Vicat softening point is determined according to a procedure described in "Chemistry and Technology of Artificial Substances in Individual Presentations," volume I, by Nitsche-Pfestorf, "Technical Evaluation of Electrotechnical Insulation Materials," page 242. The residual monomer content is determined by extraction with isopropanol and U.V. analysis of the resulting solution. Intrinsic viscosity is determined by plotting data obtained from the solubility of varying strength polymer solutions in toluene at 30° C. Other measurements are made as follows:

| Property: | Test method used |
| --- | --- |
| Heat distortion temperature, °F. | ASTM–D–648–56 |
| Notched impact strength, ft.-lb./in. | ASTM–D–256–56 |
| Tensile strength, p.s.i. | ASTM–D–638–56T |

The novel method of my invention is further illustrated by the following examples. In the examples the word "parts" is used to indicate parts by weight. The "parts" of catalyst, suspending agent, and surfactant are parts by weight of total monomer.

EXAMPLE I

A mixture of 90 parts styrene, 10 parts alpha-methylstyrene, 0.12 part t-butyl perbenzoate, 112 parts deionized water, 1.91 parts calcium phosphate, and 0.0064 part of Nacconol NRSF, a commercially available alkyl aryl sulfonate, was placed in a 100-gallon reactor. The reactor was purged with nitrogen and the mixture was heated to 100° C. during a period of 1.5 hours. The temperature was then raised to 110° C. and held thereat for 7 hours. It was then raised to 140° C. for ½ hour. Steam stripping was started at 140° C. with a reactor pressure of 40 p.s.i.g. After 3.5 hours, 5.8 parts of hydrocarbons had been recovered. The product was then treated with 37% HCl, centrifuged, and thereafter washed with water. It was dried at a temperature of about 70° C. for two hours. The product had a Vicat softening temperature of 104° C. The relative viscosity of a 1% solution of the copolymer in toluene at 30° C. was 2.0.

EXAMPLE II

A mixture of 85 parts styrene and 15 parts alpha-methylstyrene containing 0.10 part t-butyl perbenzoate, was copolymerized in suspension in a manner substantially similar to that described in Example I. The heating time at 110° C. was 15 hours; thereafter the temperature was raised to 135° C. The unreacted monomers were removed by stripping with steam at 135° C. in about seven hours. The Vicat softening point of the product was 106° C. and the relative viscosity of a 1% solution of the copolymer in toluene at 30° C. was 1.9.

EXAMPLE III

Following the method of the previous examples, a mixture of 70 parts styrene and 30 parts alpha-methylstyrene was copolymerized in suspension in the presence of 0.14 part t-butyl perbenzoate. At intervals during the polymerization a sample of the product was removed and separated from the monomer. The polymerization time and temperature, the percent conversion, the intrinsic viscosity, the molecular weight, and the Vicat softening point for each sample are indicated below in Table II.

TABLE II

*Copolymerization of 70:30 Mixture of Styrene and Alpha-Methylstyrene with 0.14 Parts t-Butyl Perbenzoate*

| Hours at 100° C. | Hours at 110° C. | Percent Conversion | Intrinsic Viscosity [a] | Molecular Weight | Vicat Softening Point |
| --- | --- | --- | --- | --- | --- |
| 10 | ------ | 32 | 0.62 | 87,000 | -------- |
| 20 | ------ | 56 | 0.71 | 104,000 | 109 |
| 36 | ------ | 93 | 0.83 | 130,000 | 114 |
| 50 | ------ | 96 | 0.83 | 130,000 | 111 |
| 50 | 12 | 97 | 0.84 | 132,000 | 111 |
| 50 | 12 | ------ | -------- | -------- | [b] 98 |

[a] In toluene at 30° C.
[b] Not separated from monomer.

EXAMPLE IV

The procedure of Example III was substantially repeated. A mixture of 90 parts styrene and 10 parts alpha-methylstyrene was copolymerized at 120° C. in the presence of 0.11 part of dicumyl peroxide. A similar monomer mixture was also copolymerized in the absence of a peroxide. Samples were taken at intervals during polymerization and residual monomers were removed therefrom by precipitation from benzene. The results are summarized below in Table III.

TABLE III

*Copolymerization of a 90:10 Mixture of Styrene and Alpha-Methylstyrene*

| Parts Dicumyl Peroxide | Hours at 120° C. | Percent Conversion | Intrinsic Viscosity [a] | Molecular Weight | Vicat Softening Point |
|---|---|---|---|---|---|
| 0.11 | 12 | 96 | 0.94 | 153,000 | 106 |
| 0.11 | 30 | 99 | 0.94 | 153,000 | 106 |
| 0.00 | 12 | 65 | 1.17 | 206,000 | 107 |
| 0.00 | 30 | 89 | 1.15 | 202,000 | 105 |
| 0.00 | 50 | 94 | 1.15 | 202,000 | 108 |

[a] In toluene at 30° C.

EXAMPLE V

Following the procedure of Example I, a mixture of 80 parts styrene and 20 parts alpha-methylstyrene was copolymerized in the presence of 0.10 part t-butyl perbenzoate. The mixture was heated for 24 hours at 105° C. and then for two hours at 135° C. The residual monomer content was 1.3% styrene and 1.4% alpha-methylstyrene, based upon the weight of total charge. After removal of the monomers by precipitation from benzene, the Vicat softening temperature was 110° C. The relative viscosity of a 1% solution of the copolymer in toluene at 30° C. was 2.1.

EXAMPLE VI

A mixture of 85 parts styrene and 15 parts alpha-methylstyrene was copolymerized in suspension in the presence of 0.12 part t-butyl perbenzoate using the procedure of the previous examples. The temperature was held at 110° C. for 15 hours, and then at 120° C. for six hours. The product had a Vicat softening temperature of 101° C. even without the removal of the residual monomers. After steam stripping for seven hours at 135° C. the Vicat softening point was 107° C. The ASTM heat distortion temperature was 210° F. The residual monomer recovered was less than 1%.

EXAMPLE VII

Using the method of the previous examples, a mixture of 85 parts styrene, 15 parts alpha-methylstyrene and 0.20 part of t-butyl perbenzoate was polymerized in suspension for 11 hours at 100° C. Steam stripping was carried out at 100° C. for 30 hours, then at 150° C. for two hours. The conversion was 76% and the ASTM heat distortion temperature was 211° F. The relative viscosity of a 1% solution of the copolymer in toluene at 30° C. was 2.0. This example illustrates the necessity of obtaining about 90% conversion in order to obviate a prolonged steam stripping operation and the requirement of expensive recovery facilities for recovering the removed monomer from the steam.

I have thus provided a novel, commercially operable method for styrene-alpha-methylstyrene polymerization having a considerably reduced polymerization time. The product made by this process is exceptional in respect of its dimensional stability to heat. The reduction of the polymerization cycle makes possible a substantial increase in plant out-put, thus reducing the overall equipment cost per pound of product. The high conversions obtained with my method obviate sizable recovery facilities for processing the residual monomer separated after the polymerization step.

I claim:

1. Method of making styrene-alpha-methylstyrene copolymers by suspension polymerization by suspending in an aqueous medium, in the presence of a suspension agent, a mixture of monomers consisting of 95–70 parts styrene and 5–30 parts alpha-methyl styrene, controlling the free radical concentration throughout the polymerization to permit a slight increase thereof as polymerization progresses by adding to the mixture 0.10–0.20 parts by weight based upon the weight of said mixture of an organic peroxide decomposing at a temperature of 100–125° C., heating the catalyst-containing mixture in an inert atmosphere at a temperature of 100–125° C. until at least about 90% conversion of monomer to polymer has been effected, whereby a copolymer having an intrinsic viscosity of 0.5–1.0 is produced, and removing the residual monomer from the polymerized mass.

2. Method according to claim 1 wherein the residual monomer is removed from the polymerized mass by precipitation of the polymer from a solvent medium.

3. Method according to claim 1 wherein the catalyst is selected from the group consisting of t-butyl perbenzoate, dicumyl peroxide, and di-t-butyl peroxide.

4. Method according to claim 3 wherein the catalyst is t-butyl perbenzoate.

5. Method of making styrene-alpha-methylstyrene copolymers having a Vicat softening point of 105–115° C. by suspension polymerization by suspending in an aqueous medium, in the presence of a suspension agent, a mixture of monomers consisting of 95–70 parts styrene and 5–30 parts alpha-methylstyrene, controlling the free radical concentration throughout the polymerization to permit a slight increase thereof as polymerization progresses by adding to the mixture 0.10–0.20 part by weight based upon the weight of said mixture of an organic peroxide decomposing at a temperature of 100–125° C., heating the catalyst-containing mass in an inert atmosphere at a temperature of 100–125° C. for about 11–26 hours, and removing the residual monomer from the polymerized mixture by stripping with steam at temperatures of 100–150° C. for 5–10 hours.

References Cited in the file of this patent

UNITED STATES PATENTS

| | | |
|---|---|---|
| 2,455,342 | Seymour | Nov. 30, 1948 |
| 2,468,748 | Griess | May 3, 1949 |
| 2,556,459 | Wesp | June 12, 1951 |
| 2,638,465 | Amos et al. | May 12, 1953 |
| 2,656,334 | D'Alelio | Oct. 20, 1953 |
| 2,673,194 | Grim | Mar. 23, 1954 |
| 2,715,118 | Grim | Aug. 9, 1955 |
| 2,797,209 | Hutchinson et al. | June 25, 1957 |

FOREIGN PATENTS

| | | |
|---|---|---|
| 937,918 | Germany | Jan. 19, 1956 |

OTHER REFERENCES

D'Alelio: Fundamental Principles of Polymerization, 1952, John Wiley & Sons, New York, N.Y., pages 205–206.